United States Patent [19]

Hutchinson et al.

[11] 3,855,855
[45] Dec. 24, 1974

[54] IMPRESSION PACKER

[75] Inventors: Stanley O. Hutchinson, Bakersfield; Glenn W. Anderson, Oildale; Gordon L. Newby, Bakersfield, all of Calif.

[73] Assignee: Chevron Research Company, San Francisco, Calif.

[22] Filed: June 25, 1973

[21] Appl. No.: 373,342

[52] U.S. Cl. ................................ 73/151, 260/5
[51] Int. Cl. ............................. E21b 47/00
[58] Field of Search .......... 73/151; 260/5; 264/337, 264/225

[56] References Cited
UNITED STATES PATENTS
3,046,601   7/1962   Hubbert et al...................... 73/151

*Primary Examiner*—Donald O. Woodiel
*Assistant Examiner*—Anthony V. Ciarlante
*Attorney, Agent, or Firm*—Edward J. Keeling; Ralph L. Freeland, Jr.

[57] ABSTRACT

An impression packer for use in obtaining impressions in wells and having an impression sleeve formed of a mixture of synthetic nitrile rubber, natural rubber smoked sheet, silica powder and rubber processing oil.

3 Claims, 3 Drawing Figures

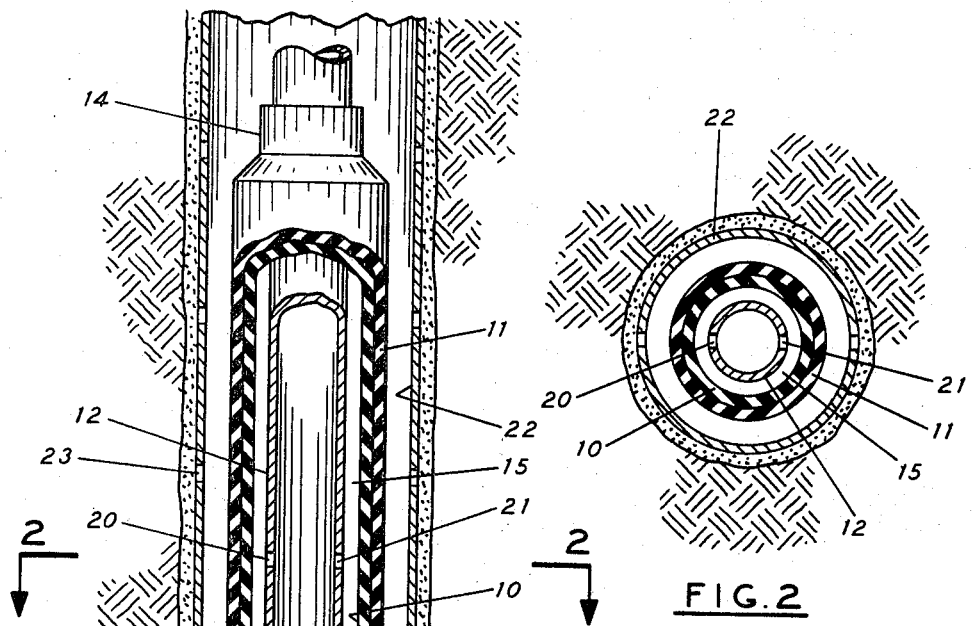
FIG. 2
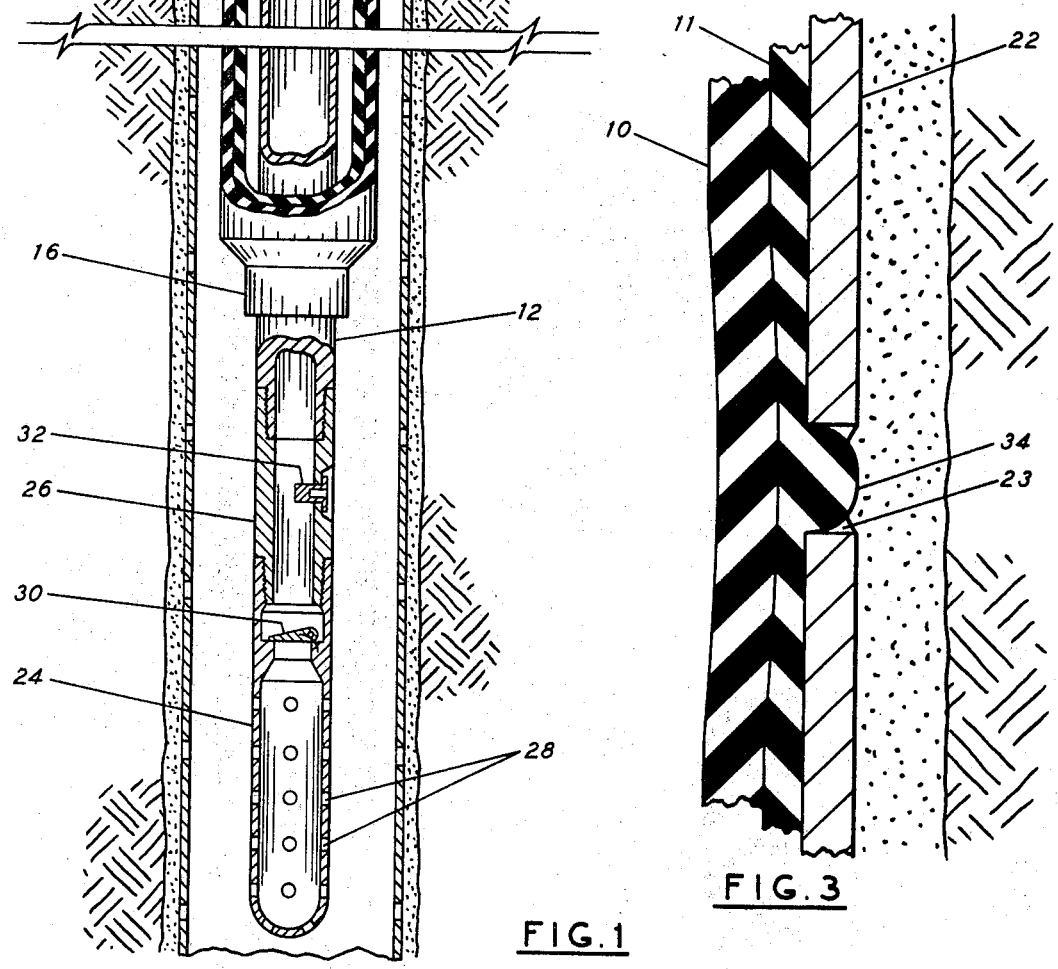
FIG. 1
FIG. 3

IMPRESSION PACKER

BACKGROUND OF THE INVENTION

The present invention is directed to an impression packer and more particularly this invention is directed to an impression packer utilizing a mixture of synthetic nitrile rubber, natural rubber smoked sheet, silica powder and rubber processing oil rolled into sheet form for the impression receiving sleeve.

It is often very desirable to know the condition of pipe or liners located in wells. For example, it is important to know whether or not perforations or slots in a liner are open or plugged. It is also often important to know the condition of the pipe or liner itself, i.e., is it in good condition or is it cracked or split. It is also sometimes desirable to know what the surface of a formation penetrated by a well is like.

One means of determining the condition of these downhole occurrences is the use of an impression packer. An impression packer is a device which is run down hole and has a surface which is pressed against the pipe or formation which surface will form and retain an impression of irregularities in the surface of the pipe such as, for example, perforations or cracks in the pipe. Impression packers are not new. Such packers are disclosed in U.S. Pats. No. 2,416,441; 2,618,014; and 2,653,474, for example. However, impression packers known heretofore had only limited success. A principal cause of the lack of success is believed to be the absences of a suitable material for receiving and retaining the impression.

The present invention provides a material for forming an impression sleeve of an impression packer. The impression sleeve is formed of a material which will retain impressions and which will expand and retract so that an impression may be made and then so the packer may be removed from the well so the impression may be examined. The material used to form the impression sleeve must be smooth so that impression detail will be readily observable on the sleeve after a run of the impression packer. That is, the surface of the impression sleeve must not be so rough that detail of the impression is lost. Generally a surface which feels smooth to the hand and visually appears to have no major roughness is required.

BRIEF DESCRIPTION OF THE PRESENT INVENTION

The present invention provides a material useful as an impression sleeve of an expandable and retractable packer which sleeve will form and retain an impression of irregularities in a downhole surface. The material is formed of a mixture of synthetic nitrile rubber, natural rubber smoked sheet, hydrated amorphous silica powder and rubber processing oil. A mixture containing from about 60 to 80 percent by weight of synthetic nitrile rubber; from about 10 to 20 percent natural rubber smoked sheet; from about 5 to 15 percent by weight of hydrated amorphous silica powder; and from about 2 to 6 percent by weight of rubber processing oil has been found satisfactory. A particularly desirable impression sleeve has resulted when the mixture comprises from about 70 to 75 percent by weight of synthetic nitrile rubber; from 14 to 16 percent by weight of natural rubber smoked sheet; about 7 to 8 percent by weight silica powder; and about 3 to 4 percent be weight rubber processing oil.

OBJECT OF THE INVENTION

A principal object of the present invention is to provide an oil resistant material for use as the impression sleeve of a packer for use in well operations to determine the condition of a downhole surface. Further objects and advantages of the present invention will become apparent from the following detailed description read in light of the accompanying drawing.

IN THE DRAWINGS

FIG. 1 is an elevation view with parts broken away for clarity of presentation and illustrates apparatus assembled in accordance with the present invention;

FIG. 2 is a sectional view taken at line 2—2 of FIG. 1; and

FIG. 3 is an enlarged partial elevation view and illustrates the impression element of the present invention in contact with a well liner.

DESCRIPTION OF THE PREFERRED EMBODIMENT

The preferred arrangement of apparatus of the present invention will now be described in detail with reference to the drawings and to FIGS. 1 to 3 in particular. Tha apparatus of the present invention provides an inflatable impression packer useful in well operations. The packer includes a tubular mandrel section having a resilient inflatable sleeve and an impression sleeve connected thereto. When inflated the impression sleeve expands and sealingly engages the inside of a well and conforms with irregularities therein. After a predetermined time period the packer is deflated and the impression sleeve. However, the impressions on the sleeve remain intact and may be investigated when the packer is returned to the surface.

The packer is illustrated inside of well liner 22. The liner 22 is used to line the wall of the well as is known in the art and may contain an opening such as opening 23 which opens communication with a formation behind the liner 22. An inflatable resilient sleeve 10 is connected at its upper and lower ends in fluid-tight relationship to an elongated tubular mandrel section 12. The connection is made in any suitable manner such as, for example, by clamping units indicated by the numerals 14 and 16. An impression sleeve 11 is connected to the resilient sleeve 12 and is expandable and retractable therewith. The impression sleeve is adapted to form and retain an impression record of a surface against which it is pressed.

The tubing section 12 extends through the clamping units 14 and 16. The upper end of the tubing 12 is usually connected into a segmented tubing string which extends to the top of the well. If desired, however, the tubing section may be connected through an appropriate linkage system to a wireline. In this event suitable inflation devices for inflating the inflatable element are run into the well with the tubing section on the wireline. When the tubing section is run into the well on a segmented tubing string the resilient sleeves 10 and 11 can be inflated by flowing a fluid down the interior of the tubing string into the tubing section and then through the tubing section through suitable holes 20 and 21 therein provided.

In preferred form the lower end of the tubing section 12 is connected to a float shoe 24 by means of an intermediate sub 26. The float shoe 24 has a plurality of holes 28 to permit entry of well fluids into the interior of the shoe 24. An upwardly opening check valve, such as flapper valve 30, is located in the float shoe 24 above the holes 28. When the flapper valve is open well fluids can communicate with the interior of the tubing section 12 and the tubing connected thereabove. When well liquids are encountered when the inflatable packer of the present invention is being run into a well on a segmented tubing string the flapper valve 30 opens to permit entry of the well fluids into the interior of the tubing section 12 and the tubing string. This equalizes the pressure on the interior and the exterior of the packer and permits later inflation of the inflatable resilient sleeves 10 and 11 by means of a relatively small pressure differential. This is so because the pressure needed to inflate the resilient sleeve does not need to overcome the well pressure.

When fluid is injected into the tubing section from above to apply pressure to the inflatable resilient sleeve the flapper valve is closed by the pressure and the sleeve is expanded by means of flow into the annular chamber 15 between the tubing section 12 and the inner resilient sleeve 10. Even though a column of well liquids may extend up the interior of the tubing and into the annular chamber 15 the packer is still inflated by pressurizing the tubing string from the surface. The pressure differential in the annular chamber forces the impression sleeve to sealingly engage the well wall. When sufficient time has passed for the impression record to be formed on the impression sleeve the pressure is released and the impression sleeve is retracted and moves away from sealing engagement with the well wall. The retraction of the impression sleeve is preferably caused by the resiliency of the inflatable resilient sleeve. If desired springs or other devices may be utilized to retract the impression sleeve, for example, as taught in U.S. Pat. No. 2,692,446. In any event the impression sleeve is retracted enough so that the packer may be pulled from the well without destroying the impressions formed thereon. After the impression packer operation is completed a drain port is opened below the tubing section 12 to allow the interior of the tubing to drain as the tubing is being withdrawn from the well. Thus knock-off plug 32 is positioned in the adapter sub 26. A sinker bar (not shown) is used to shear off the back of the plug 32 to open communication from the inside of the tubing to the well annulus.

The inner inflatable sleeve 10 of the packer is connected at its upper and lower ends in fluid-tight relationship by clamping units 14 and 16. Preferably as fully described in copending application Ser. No. 367,602 filed June 6, 1973, by Stanley O. Hutchison, the clamping units 14 and 16 disconnectably connect the flexible sleeve 10 in position over the tubing section 12. The disconnectable connection provided by the clamping units permits easy field repair or "dressing" of the packer. Thus if the ends of the sleeve 10 or 11 wear or abrade near the clamping units then one or more of the clamps is opened and the worn end or ends of the sleeve or sleeves trimmed off. The sleeve is then reconnected into the clamping unit.

The impression sleeve is formed of a material which will retain impressions and will expand and retract with the expansion and retraction of the inflatable resilient sleeve. The material used to form the impression sleeve must be smooth so that impression detail will be readily observable on the sleeve after a run of the impression packer. That is, the surface of the impression sleeve must not be so rough that detail of the impression is lost. Generally a surface which feels smooth to the hand and visually appears to have no major roughness is required. In applications where some exposure to petroleum is a factor a mixture of synthetic nitrile rubber, natural rubber smoked sheet and certain additives has been found to give good results.

The material useful as an impression sleeve in accordance with the present invention is a mixture of synthetic nitrile rubber, natural rubber smoked sheet, hydrated amorphous silica powder and rubber processing oil. A mixture containing from about 60 to 80 percent by weight of synthetic nitrile rubber; about 10 to 20 percent by weight of natural rubber smoked sheet; from about 5 to 10 percent by weight of hydrated amorphous silica powder; and from about 2 to 6 percent by weight of rubber processing oil has been found satisfactory. Best results are obtained when the impression material is formed of a mixture comprising about 70 to 75 percent by weight synthetic nitrile rubber; about 14 to 16 percent by weight natural rubber smoked sheet; about 7 to 8 percent by weight silica powder; and about 3 to 4 percent by weight of rubber processing oil. A particularly desirable impression sleeve has resulted when the mixture comprises about 75.0 percent synthetic nitrile rubber, about 14.3 percent by weight of natural rubber smoked sheet, about 7.1 percent be weight silica powder and about 3.6 percent by weight of rubber processing oil.

The impression sleeve material is formed by mixing the above mentioned ingredients in the proper ratios. Preferably, the mixing is accomplished in two stages. The first stage results in the formation of a natural rubber sheet having desired amounts of silica powder and rubber processing oil contained therein. The first stage rubber sheet should contain natural rubber smoked sheet 50 to 75 percent by weight, hydrated amorphous silica powder 10 to 30 percent by weight and rubber processing oil 3 to 15 percent by weight. A highly preferred first stage is formed of natural rubber smoked sheet 57.2 percent by weight, hydrated amorphous silica powder 28.4 percent by weight, and rubber processing oil 14.4 percent by weight. The second stage mixing is accomplished by mixing the above described first stage rubber sheet with a predetermined amount nitrile rubber to give the desired ratios in accordance with this invention.

The first stage mixing is preferably accomplished by first introducing a known weight of natural rubber smoked sheet into a rubber processing rolling mill. As known in the art, a rubber processing rolling mill usually comprises two parallel adjustable counterrotating rolls rotating at slightly different speeds. Rubber is fed between the rolls and the squeezing and friction caused by the differential speeds of the rolls heats and breaks the nerve of the rubber causing it to smooth out and form a relatively thin coating around one of the rolls. The thickness of the sheet can be adjusted within limits by proper spacing of the rollers and the amount of rubber introduced into the rolls.

After an initial period of rolling which is generally accomplished in about 15 to 20 minutes sufficient heat and friction are generated to reduce the nerve or resiliency of the natural rubber to cause it to form a sheet on one of the rolls. The desired weights of the additives are then added to the rubber as it is being rolled. To facilitate mixing the rubber sheet is continually cut off the roll and re-rolled during the mixing period. This results in thorough mixing and squeezing of the rubber and the additives and eventually a smooth rubber sheet of the mixture is formed around one of the rolls. A time of about 15 to 20 minutes is generally sufficient to mix the rubber and the additives to form a suitable first stage material. After such a sheet has been formed on one of the rolls the sheet is cut and removed from the roll.

The second stage mixing is accomplished by first feeding into the set of rubber rolls a known weight of nitrile rubber and rolling the nitrile rubber until the nerve is broken and a rubber sheet is formed about one of the rolls. This usually requires about 15 to 20 minutes. Pieces of the first stage sheet are then added to the rolls to combine with the second stage sheet in the moving rolls. Sufficient first stage sheet is added to form an impression cover material in sheet form having the herein disclosed proportions by weight. At such time which may be about 15 to 20 minutes the sheet of material is cut and removed from the rolls.

The sheet of impression material is allowed to cool. It is then ready to be connected to an inflatable sleeve of a packer to form an impression sleeve in accordance with the present invention. The size of the sheet, of course, may be rolled to conform with the size of an impression sleeve it is desired to make or the sheet taken from the rolls may be cut into suitable strips and run through an extruder to get a continuous sheet of desired length. For example, in one demonstration small rolls having a circumference of only 3 to 5 feet were used to produce an impression material sheet. It was desired to use a continuous sheet of 30 feet in length by 16 inches in width by 0.150 inch in thickness for forming an impression sleeve. The impression material formed on the small rolls was cut into narrow strips and run through an extruder to get a 30 foot long continuous sheet.

The so formed impression sheet is connected to an inflatable sleeve of a packer to form an impression. When using a rubber inflatable sleeve it has been found satisfactory to bond the impression sheet to the inflatable sleeve with rubber adhesive. The preferred manner to bond the layers together comprises coating one side of the impression sheet with rubber adhesive such as, for example, Rubatex No. 372 (a rubber adhesive of Rubatex Corp., Bedford, Va. 24523) and allowing it to dry until slightly tacky. During the drying period the outside of the inflatable sleeve is also coated with the rubber adhesive. The impression sheet is then smoothly contacted with the inflatable sleeve with about a 1 inch overlap to thus form the impression sleeve.

The synthetic nitrile rubber of the present invention is uncured and is of high nitrile content. They are the result of copolymerization acrylonitrile and butadene. High nitrile content generally means that the acrylonitrile content is 37 percent or higher. A suitable high nitrile rubber for use in the present invention is sold by Goodyear under the trade designation "CHEMIGUM N—318B."

The natural rubber useful in accordance with the present invention is classified as smoked sheet natural rubber. As noted at page 19 of the Vanderbilt Rubber Handbook published by R. T. Vanderbilt Co., Inc., 230 Park Avenue, New York, N.Y. 10017, there are seven types of natural rubber available in the market. Each type is classified according to the preparation given the rubber and the source of the rubber. Smoked sheet is formed of coagulated rubber sheets properly dried and smoked. There are seven grades of smoked sheet available ranging from highest quality No. 1XRSS to lowest quality No. 6 RSS. Although under some conditions any of these grades may be employed in the present invention, it is usually preferred to use at least grade 1 RSS or better.

The silica powder used in accordance with the invention is hydrated amorphous silica. A preferred silica powder is sold under the trade name "High Sil 210" and is produced by Chemical Division of Pittsburgh Plate Glass Co. The function of the silica powder is to smooth out the surface of the rubber. Powder fills the pores of the rubber and provides a smooth surface on which impressions are clearly visible. When present in the final rubber nitrile rubber — natural rubber mixture in suitable proportions, i.e., 5 to 15 percent by weight, the silica powder provides a desirable smooth finish without causing the rubber to be undesirably hard.

The liquid processing oil is useful as a plasticizer and may be one of the plasticizers normally used in the rubber industry. These include mineral oil and other liquid hydrocarbons and various synthetic oils. The preferred liquid processing oil for use in the present invention is a hydrocarbon based material produced by the Golden Bear Oil Company of Bakersfield, Calif. and sold under the trade and identification of LPO.

In operation the inflatable impression packer is first run into a well to a position adjacent the surface to be investigated. Fluid is forced into the annular chamber 15 to expand the inner resilient sleeve 10 and the outer impression sleeve 11. As noted in FIG. 3 the impression sleeve 11 will deform into an opening such as slot 23 and a projection 34 which is an impression of the slot will form. Generally it is desirable to apply a differential pressure in the packer of at least about 100 psi above the wellbore pressure where the packer is being inflated. That is the differential pressure on the pressurizing fluid should be maintained at at least 100 psi for about 10 minutes. Rarely are pressures in excess of 150 psi when using the impression material of the present invention. The impression sleeve is useful in wells having temperatures up to about 180°F.

Thus in summary the present invention provides an inflatable impression packer for use in wells. A material is used in forming the impression sleeve which combines desirable qualities of resiliency and memory so as to record and retain impressions as well as to be capable of expansion and retraction.

Although certain preferred embodiments of the present invention have been herein described in order to provide an example of its construction and steps sufficient for usage by those skilled in the art, it is to be understood that various changes and innovations in the structure described can be effected without departure from the basic principles of the invention. Changes and revisions of this sort which continue to rely on these principles are therefore deemed to be circumscribed by the spirit and scope of the appended claims.

We claim:

1. An impression packer comprising a tubing section, an elongated resilient sleeve positioned over said tubing section, means connecting the ends of said sleeve in fluid-tight relationship with said tubing section to form an annular chamber between said tubing section and said sleeve, port means communicating with said annular chamber for inflating said resilient sleeve and an impression sleeve connected to said resilient sleeve for expansion and contraction therewith, said impression sleeve comprising a smooth rolled sheet containing about 60 to 80 percent by weight synthetic nitrile rubber, about 10 to 20 percent by weight natural rubber smoked sheet, about 5 to 15 percent by weight hydrated amorphous silica, and between 2 and 6 percent by weight of rubber processing oil.

2. An impression packer comprising a tubing section, an elongated resilient sleeve positioned over said tubing section, means connecting the ends of said sleeve in fluid-tight relationship with said tubing section to form an annular chamber between said tubing section and said sleeve, port means communicating with said annular chamber for inflating said resilient sleeve and an impression sleeve connected to said resilient sleeve for expansion and contraction therewith, said impression sleeve comprising a smooth rolled sheet containing about 70 to 75 percent by weight synthetic nitrile rubber, about 14 to 16 percent by weight natural rubber smoked sheet, about 7 to 8 percent by weight hydrated amorphous silica, and about 3 to 4 percent by weight of rubber processing oil.

3. An impression packer comprising a tubing section, an elongated resilient sleeve positioned over said tubing section, means connecting the ends of said sleeve in fluid-tight relationship with said tubing section to form an annular chamber between said tubing section and said sleeve, port means communicating with said annular chamber for inflating said resilient sleeve and an impression sleeve connected to said resilient sleeve for expansion and contraction therewith, said impression sleeve comprising a smooth rolled sheet containing about 75.0 percent by weight synthetic nitrile rubber, about 14.3 percent by weight natural rubber smoked sheet, about 7.1 percent by weight hydrated amorphous silica, and about 3.6 percent by weight of rubber processing oil.

* * * * *